(12) United States Patent
Landmann et al.

(10) Patent No.: US 9,805,150 B2
(45) Date of Patent: Oct. 31, 2017

(54) METHODS AND SYSTEMS FOR DETERMINING A STRUCTURAL PARAMETER FOR NOISE AND VIBRATION CONTROL

(71) Applicant: THE BOEING COMPANY, Huntington Beach, CA (US)

(72) Inventors: Alan E. Landmann, Woodinville, WA (US); Mark A. Negley, Kirkland, WA (US); Bret A. Voss, Seattle, WA (US); Jaffar S. Iqbal, Seattle, WA (US)

(73) Assignee: The Boeing Company, Chicago, IL (US)

( * ) Notice: Subject to any disclaimer, the term of this patent is extended or adjusted under 35 U.S.C. 154(b) by 617 days.

(21) Appl. No.: 14/447,171

(22) Filed: Jul. 30, 2014

(65) Prior Publication Data
US 2016/0034611 A1 Feb. 4, 2016

(51) Int. Cl.
G06F 17/50 (2006.01)
(52) U.S. Cl.
CPC ...... G06F 17/5018 (2013.01); G06F 17/5095 (2013.01); G06F 2217/82 (2013.01)
(58) Field of Classification Search
None
See application file for complete search history.

(56) References Cited

U.S. PATENT DOCUMENTS

| | | | |
|---|---|---|---|
| 5,356,264 A | 10/1994 | Watson et al. | |
| 6,102,664 A | 8/2000 | Nguyen | |
| 6,796,765 B2 | 9/2004 | Kosel et al. | |
| 2002/0101135 A1* | 8/2002 | Giovanardi | G10K 11/178 310/328 |
| 2003/0055601 A1* | 3/2003 | Miyamoto | G06F 17/5018 702/182 |
| 2005/0086034 A1* | 4/2005 | Naito | G06F 17/5018 703/2 |
| 2011/0070095 A1 | 3/2011 | Harron | |
| 2013/0327588 A1* | 12/2013 | Christenson | B64C 1/064 181/207 |

* cited by examiner

Primary Examiner — Syed Roni
(74) Attorney, Agent, or Firm — Armstrong Teasdale LLP

(57) ABSTRACT

A computer system enables a noise level associated with a structural substrate to be reduced. The computer system includes a memory device for storing data, and a processor in communication with the memory device. The processor is programmed to define a modulus of elasticity, a thickness, and/or a distribution associated with one or more damping elements coupleable to the structural substrate, define at least one operating parameter associated with the structural substrate and the one or more damping elements, simulate a first performance of the structural substrate and/or the one or more damping elements to generate a first performance data set; and determine whether the first performance data set satisfies a predetermined threshold. The first performance data set is associated with the at least one operating parameter and the modulus of elasticity, the thickness, and/or the distribution associated with the one or more damping elements.

22 Claims, 6 Drawing Sheets

METHODS AND SYSTEMS FOR DETERMINING A STRUCTURAL PARAMETER FOR NOISE AND VIBRATION CONTROL

BACKGROUND

The field of the disclosure relates generally to damping mechanisms, and, more particularly, to methods and systems for use in determining a parameter associated with one or more damping elements.

At least some known assemblies (e.g., in the aircraft industry) include components that vibrate during operation. For example, at least some known aircraft include an external cabin air compressor inlet that generates high vibration levels, which often results in noise levels that exceed a desired threshold. To facilitate controlling and/or reducing a vibration and/or noise level of the external cabin air compressor inlet, at least some known aircraft include at least one vibration and/or noise-control component. However, at least some known vibration and/or noise-control components are bulky and/or inefficient and, thus, increase a weight of the aircraft to a level that may exceed a desired threshold, thereby reducing a performance level of the aircraft. Moreover, at least some known vibration and/or noise-control components are stiff and/or are not configured to withstand at least some vibration frequencies and/or temperature ranges of the aircraft.

BRIEF SUMMARY

In one aspect, a method is provided for reducing a noise level associated with a structural substrate. The method includes defining a modulus of elasticity, a thickness, and/or a distribution associated with one or more damping elements coupleable to the structural substrate, and at least one operating parameter associated with the structural substrate and the one or more damping elements. A first performance of the structural substrate and/or the one or more damping elements is simulated to generate a first performance data set. The first performance data set is associated with the at least one operating parameter and the modulus of elasticity, the thickness, and/or the distribution associated with the one or more damping elements. It is determined whether the first performance data set satisfies a predetermined threshold.

In another aspect, a computer system is provided for reducing a noise level associated with a structural substrate. The computer system includes one or more memory devices for storing data, and one or more processors in communication with the one or more memory devices. The one or more processors are programmed to define a modulus of elasticity, a thickness, and/or a distribution associated with one or more damping elements coupleable to the structural substrate, define at least one operating parameter associated with the structural substrate and the one or more damping elements, simulate a first performance of the structural substrate and/or the one or more damping elements to generate a first performance data set; and determine whether the first performance data set satisfies a predetermined threshold. The first performance data set is associated with the at least one operating parameter and the modulus of elasticity, the thickness, and/or the distribution associated with the one or more damping elements.

In yet another aspect, one or more computer-readable storage media are provided having computer-executable instructions embodied thereon. When executed by at least one processor, the computer-executable instructions cause the processor to define a modulus of elasticity, a thickness, and/or a distribution associated with one or more damping elements coupleable to the structural substrate, define at least one operating parameter associated with the structural substrate and the one or more damping elements, simulate a first performance of the structural substrate and/or the one or more damping elements to generate a first performance data set; and determine whether the first performance data set satisfies a predetermined threshold. The first performance data set is associated with the at least one operating parameter and the modulus of elasticity, the thickness, and/or the distribution associated with the one or more damping elements.

The features, functions, and advantages described herein may be achieved independently in various embodiments of the present disclosure or may be combined in yet other embodiments, further details of which may be seen with reference to the following description and drawings.

Figure 1:
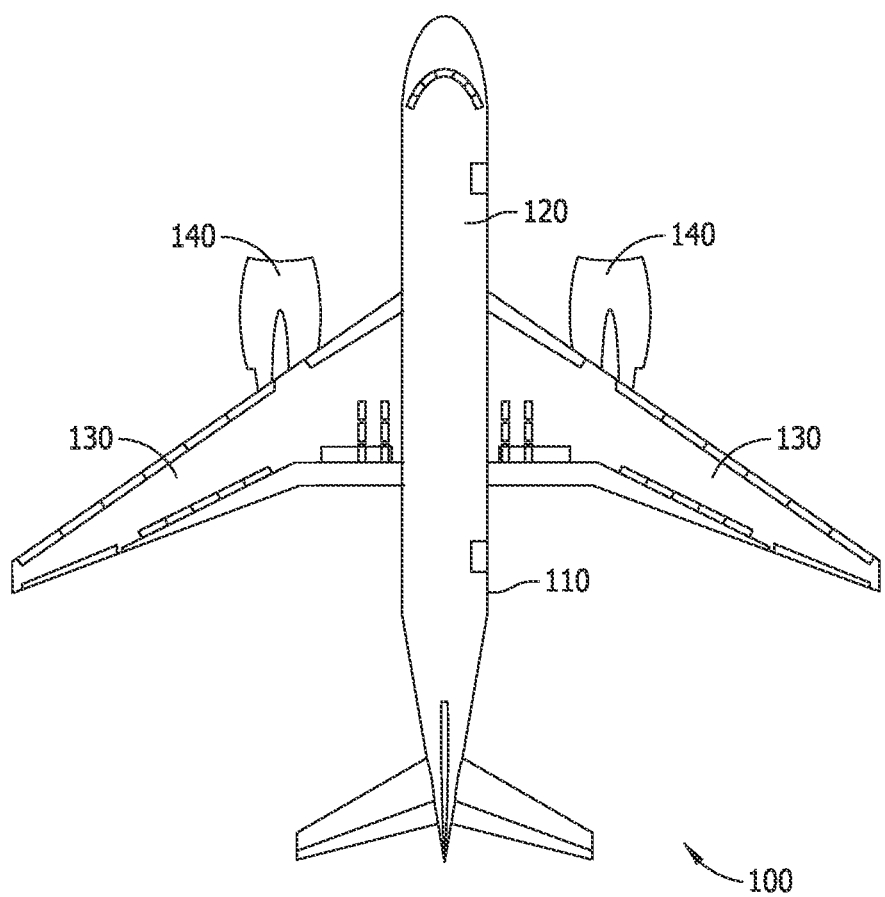
FIG. 1 is a plan view of an exemplary aircraft.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

The subject matter described herein relates generally to damping mechanisms and, more particularly, to methods and systems for use in determining a structural parameter of a damping mechanism to facilitate reducing a noise level associated with a structural substrate coupled to the damping mechanism. In one embodiment, a modulus of elasticity, a thickness, and/or a distribution associated with one or more damping elements, and at least one operating parameter associated with the structural substrate and the one or more damping elements are defined. A first performance of the structural substrate and/or the one or more damping elements is simulated to generate a first performance data set. The performance data set is compared with a predetermined threshold to facilitate identifying a desired structural parameter associated with the one or more damping elements, such that a vibration and/or noise level associated with the structural substrate may be reduced.

The methods and systems described herein may be implemented using computer programming or engineering techniques including computer software, firmware, hardware, or any combination or subset thereof, wherein the technical effects may be achieved by performing at least one of the following steps: (a) defining a modulus of elasticity, a thickness, and/or a distribution associated with one or more damping elements; (b) defining at least one operating parameter associated with the structural substrate and the one or more damping elements; (c) simulating a first performance of the structural substrate and/or the one or more damping elements to generate a first performance data set; (d) generating a finite element model associated with the structural substrate and/or the one or more damping elements; (e) performing a finite element analysis using the finite element model; (f) determining a strain energy distribution of the structural substrate and/or the one or more damping elements; (g) defining the distribution associated with the one or more damping elements based on the strain energy distribution; (h) adjusting a material property of the one or more damping materials by determining at least one of an alcohol content and a filler content; (i) determining whether the first performance data set satisfies a predetermined threshold; and (j) identifying the modulus of elasticity, the thickness, and/or the distribution associated with the one or more damping elements as a desired structural parameter for use in reducing the noise level associated with the structural substrate.

The following detailed description illustrates embodiments of the disclosure by way of example and not by way of limitation. It is contemplated that the disclosure has general application to determining a structural parameter of a damping mechanism to facilitate reducing a noise level associated with a structural substrate coupled to the damping mechanism.

An element or step recited in the singular and preceded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

FIG. 1 is a plan view of an exemplary aircraft 100. In the exemplary embodiment, aircraft 100 includes a body 110 that includes a fuselage 120. Fuselage 120 includes a cabin defined therein. In the exemplary embodiment, body 110 includes a pair of wings 130 extending from fuselage 120. In the exemplary embodiment, at least one engine 140 is coupled to each wing 130 to provide thrust to aircraft 100.

Figure 2:
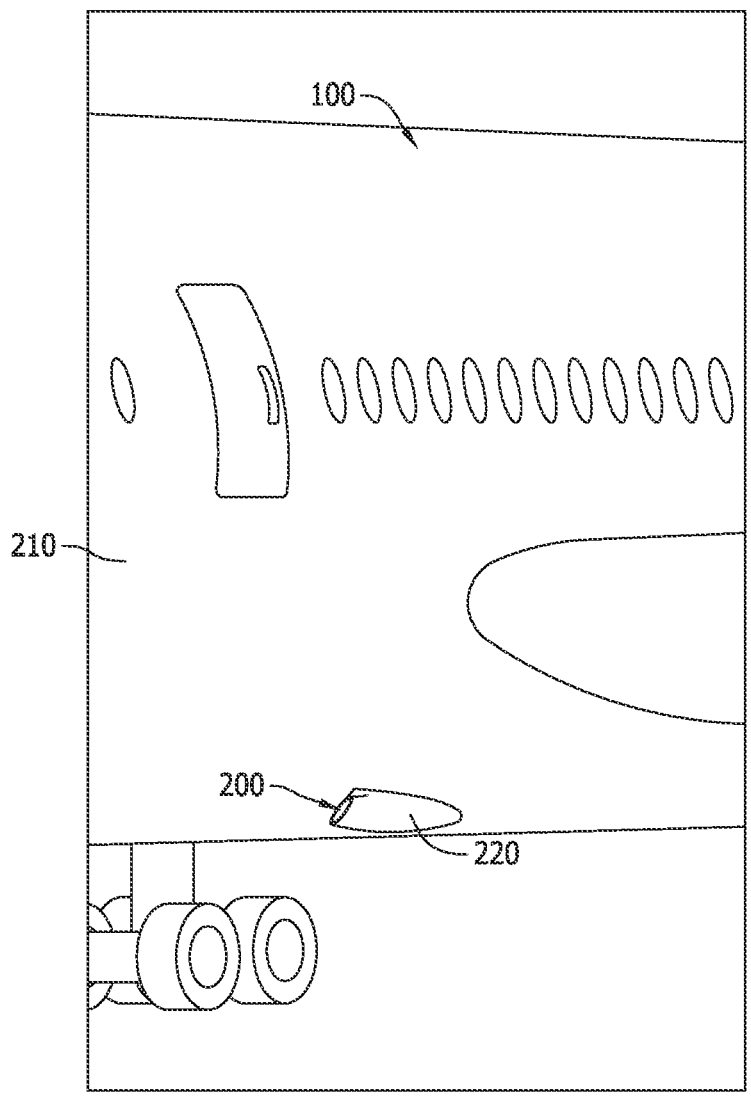
FIG. 2 is a perspective view of an exemplary cabin air compressor (CAC) inlet that may be used with the aircraft shown in FIG. 1.

FIG. 2 is a perspective view of an exemplary cabin air compressor (CAC) inlet 200 that at least partially defines an outer surface 210 of aircraft 100. CAC inlet 200 is configured to channel air from an external source for use in the cabin of aircraft 100. In the exemplary embodiment, CAC inlet 200 includes at least one surface 220 that has a complex configuration (i.e., surface 220 is not planar). For example, in one implementation, surface 220 is contoured to facilitate reducing a drag associated with CAC inlet 200. Alternatively, CAC inlet 200 may have any shape and/or configuration that enables CAC inlet 200 to function as described herein.

In the exemplary embodiment, CAC inlet 200 is fabricated from at least one material that enables CAC inlet 200 to substantially maintain its physical shape and/or configuration in a plurality of operating environments. In one implementation, CAC inlet 200 includes a composite layer and/or is fabricated from a composite material. Alternatively, CAC inlet 200 may include and/or be fabricated from any material, such as metal, polymer, fiberglass, and/or carbon fiber.

Figure 3:
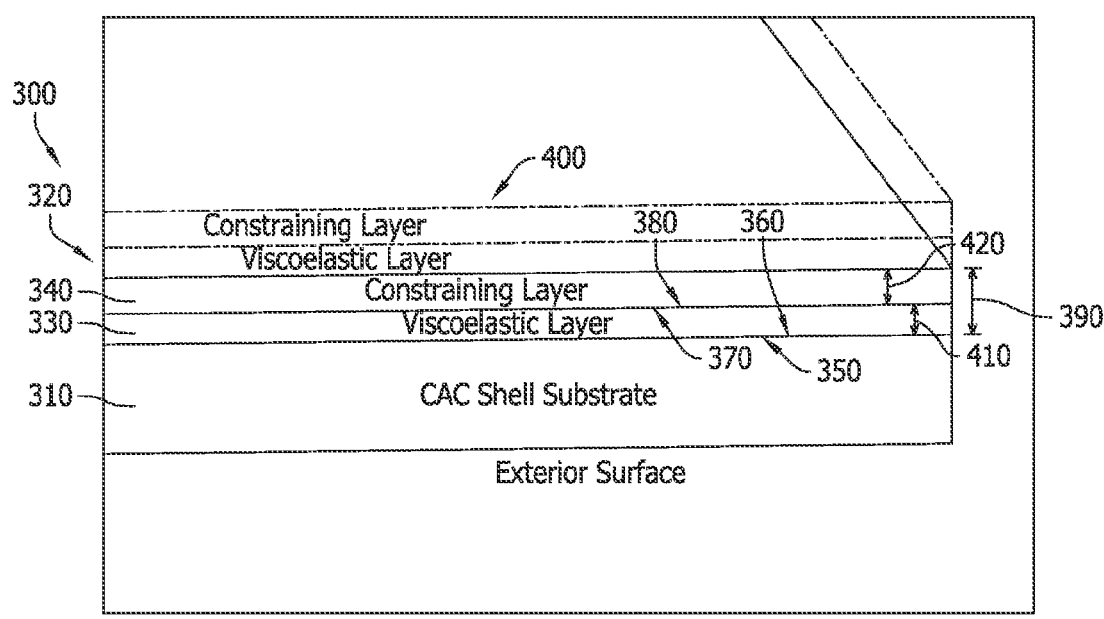
FIG. 3 is a cross-sectional view of an exemplary panel including a structural substrate and one or more damping elements that may be used with the aircraft shown in FIG. 1 and/or the CAC inlet shown in FIG. 2.

FIG. 3 is a cross-sectional view of an exemplary panel 300 that may be used to form at least a portion of aircraft 100, such as CAC inlet 200. In one implementation, panel 300 forms at least a portion of a shell of CAC inlet 200. Alternatively, panel 300 may form any portion and/or be any component.

In the exemplary embodiment, panel 300 includes a structural substrate 310 and one or more damping elements 320 that are coupled and/or coupleable to structural substrate 310. In one implementation, damping element 320 is laid up on an interior surface of CAC inlet 200. Alternatively, damping element 320 may be laid up on any surface that enables damping element 320 to function as described herein. In the exemplary embodiment, a first damping element 320 may be positioned or laid up on a first surface of structural substrate 310 to dampen a vibration and/or noise of structural substrate 310, and a second damping element 320 may be positioned or laid up on the first damping element 320 to further dampen the vibration and/or noise of structural substrate 310 (i.e., damping elements 320 are laid up in a plurality of layers). Additionally or alternatively, a first damping element 320 may be positioned or laid up on a first surface of structural substrate 310 to dampen a vibration and/or noise of structural substrate 310, and a second damping element 320 may be positioned or laid up on a second surface of structural substrate 310 to further dampen the vibration and/or noise of structural substrate 310.

In the exemplary embodiment, each damping element 320 includes a viscoelastic material (VEM) layer 330 and/or a constraining layer 340 that are laid up on structural substrate 310. Accordingly, in the exemplary embodiment implementation, a first VEM layer 330 is positioned or laid up on a first surface of structural substrate 310 to absorb vibrational energy and/or reduce a vibration and/or noise level transmitted by structural substrate 310, and a first constraining layer 340 is positioned or laid up on the first VEM layer 330 to apply a shear force to the first VEM layer 330 and/or shield the first VEM layer 330 from environmental conditions. In one implementation, a second VEM layer 330 is positioned or laid up on a second surface of structural substrate 310 to further absorb vibrational energy and/or reduce a vibration and/or noise level transmitted by structural substrate 310, and a second constraining layer 340 is positioned or laid up on the second VEM layer 330 to apply a shear force to the second VEM layer 330 and/or shield the second VEM layer 330 from environmental conditions. The second surface of structural substrate 310 may be on the same side (e.g., on an interior surface of CAC inlet 200) and/or adjacent to the first surface of structural substrate 310 and/or on an opposite side (e.g., on an exterior surface of CAC inlet 200) to the first surface of structural substrate 310. Additionally or alternatively, another VEM layer 330 is positioned or laid up on the first and/or second VEM layer 330 to further absorb vibrational energy and/or reduce a vibration and/or noise level transmitted by structural substrate 310, and another constraining layer 340 is positioned or laid up on the another VEM layer 330 to apply a shear force to VEM layer 330 and/or shield the another VEM layer 330 from environmental conditions.

In the exemplary embodiment, VEM layer 330 is coupled and/or coupleable to structural substrate 310, such that VEM layer 330 encapsulates at least a portion of structural substrate 310. In the exemplary embodiment, VEM layer 330 includes a urethane layer and/or is fabricated from a urethane material. In one implementation, VEM layer 330 includes a polyalcohol material, a hardening material, a filler material, a catalyst material, and a viscosity modifying material. Alternatively, VEM layer 330 may include and/or be fabricated from any material that enables damping element 320 to function as described herein. For example, in one implementation, at least one material used to fabricate VEM layer 330 is selected and/or determined based on an operating parameter, such as a temperature range, a vibration frequency range, and/or a physical configuration associated with structural substrate 310.

In the exemplary embodiment, constraining layer 340 is coupled and/or coupleable to VEM layer 330, such that constraining layer 340 encapsulates VEM layer 330. In the exemplary embodiment, constraining layer 340 includes a fiberglass layer and/or is fabricated from a fiberglass material. Alternatively, constraining layer 340 may include and/or be fabricated from any material that enables damping element 320 to function as described herein. For example, in one implementation, at least one material used to fabricate constraining layer 340 is selected and/or determined based on an operating parameter, such as a temperature range, a vibration frequency range, and/or a physical configuration associated with structural substrate 310 and/or VEM layer 330.

In the exemplary embodiment, damping element 320 is integrated into structural substrate 310. More specifically, in the exemplary embodiment, VEM layer 330 is applied directly to structural substrate 310 and backed by constraining layer 340. Any combination of structural substrate 310, VEM layer 330, and/or constraining layer 340 may be concurrently cured. In a first implementation, structural substrate 310, VEM layer 330, and constraining layer 340 are laid up and concurrently cured. In a second implementation, VEM layer 330 and constraining layer 340 are laid up and cured independent of structural substrate 310, and a lower surface 350 of VEM layer 330 is bonded to an upper surface 360 structural substrate 310. In a third implementation, constraining layer 340 is laid up and cured independent of structural substrate 310 and VEM layer 330, and a lower surface 370 of constraining layer 340 is bonded to an upper surface 380 of VEM layer 330. Alternatively, structural substrate 310, VEM layer 330, and constraining layer 340 may be cured independently and bonded together.

In the exemplary embodiment, damping element 320 has at least one structural parameter including a modulus of elasticity, a damping element thickness 390 between lower surface 350 of VEM layer 330 and an upper surface 400 of constraining layer 340, a VEM layer thickness 410 between lower surface 350 of VEM layer 330 and upper surface 380 of VEM layer 330, a constraining layer thickness 420 between lower surface 370 of constraining layer 340 and upper surface 400 of constraining layer 340, and/or a distribution of damping element 320 about structural substrate 310. The modulus of elasticity is associated with a material used to fabricate at least a portion of damping element 320 and is representative of a tendency of damping element 320 to be elastically deformed when a force is applied to damping element 320.

Figure 4:
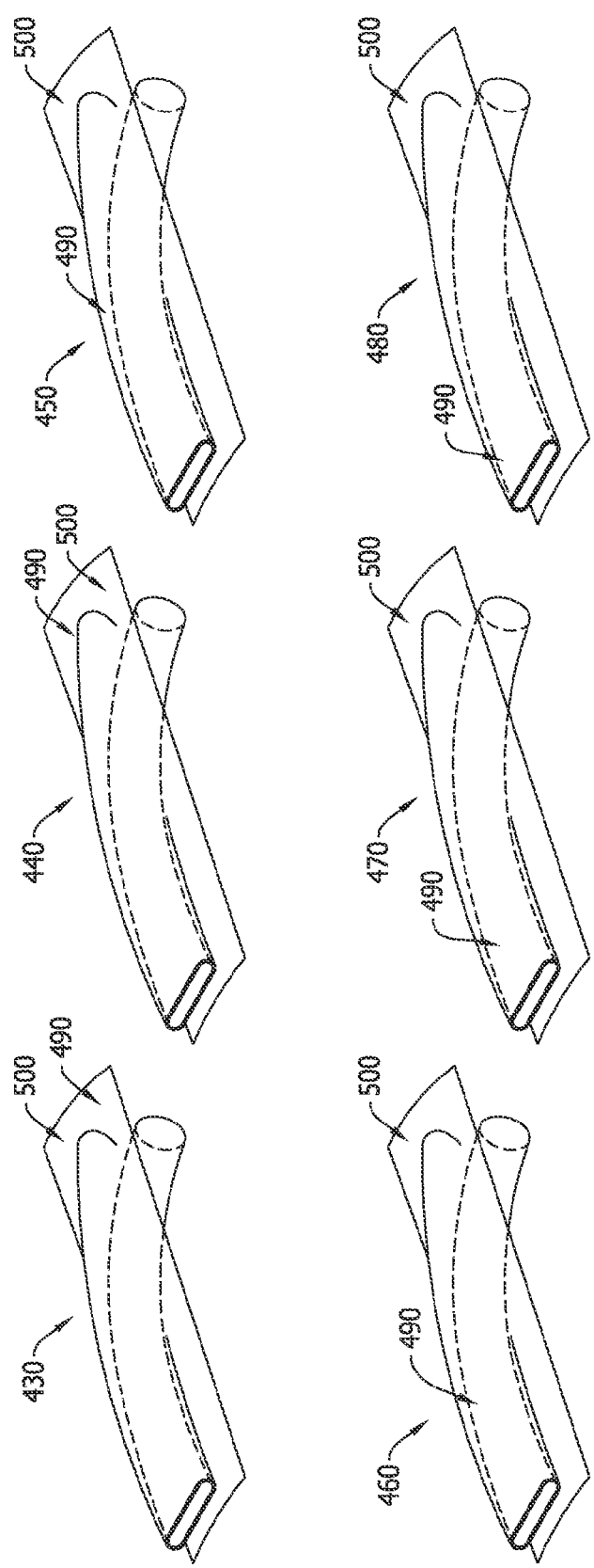
FIG. 4 is a schematic illustration of various distributions associated with the CAC inlet shown in FIG. 2 and the one or more damping elements shown in FIG. 3.

FIG. 4 is a schematic illustration of various distributions 430, 440, 450, 460, 470, and 480 of damping element 320 about CAC inlet 200. In at least some embodiments, damping element 320 is laid up and/or coupled to structural substrate 310 in accordance with a predetermined and/or desired distribution of damping element 320 about structural substrate 310, such that a first surface or portion 490 of structural substrate 310 is at least partially covered by VEM layer 330, and a second surface or portion 500 of structural substrate 310 is not covered by VEM layer 330 (i.e., second portion 500 is exposed). For example, distribution 430 is associated with a substantially-full-coverage configuration of damping element 320 about CAC inlet 200, distribution 440 is associated with a predetermined-edge-clearance configuration of damping element 320 about CAC inlet 200, distribution 450 is associated with a no-back configuration of damping element 320 about CAC inlet 200, distribution 460 is associated with a cut-sides configuration of damping element 320 about CAC inlet 200, distribution 470 is associated with a no-triangles configuration of damping element 320 about CAC inlet 200, and distribution 480 is associated with another cut-sides configuration of damping element 320 about CAC inlet 200. In at least some implementations, a distribution of damping element 320 and/or VEM layer 330 is determined based on a design specification of structural substrate 310 and/or aircraft 100, such as a position and/or orientation of fasteners and/or openings. A distribution, such as distribution 430, 440, 450, 460, 470, or 480, can be selected based on noise, vibration, weight, and/or other considerations.

To manufacture panel 300, in the exemplary embodiment, VEM layer 330 is coupled to structural substrate 310. In one implementation, VEM layer 330 is laid up when pliable, such that VEM layer 330 is easily contoured and/or shaped over structural substrate 310. In the exemplary embodiment, constraining layer 340 is coupled to VEM layer 330. In one implementation, constraining layer 340 is laid up when pliable, such that constraining layer 340 is easily contoured and/or shaped over VEM layer 330.

Figure 5:
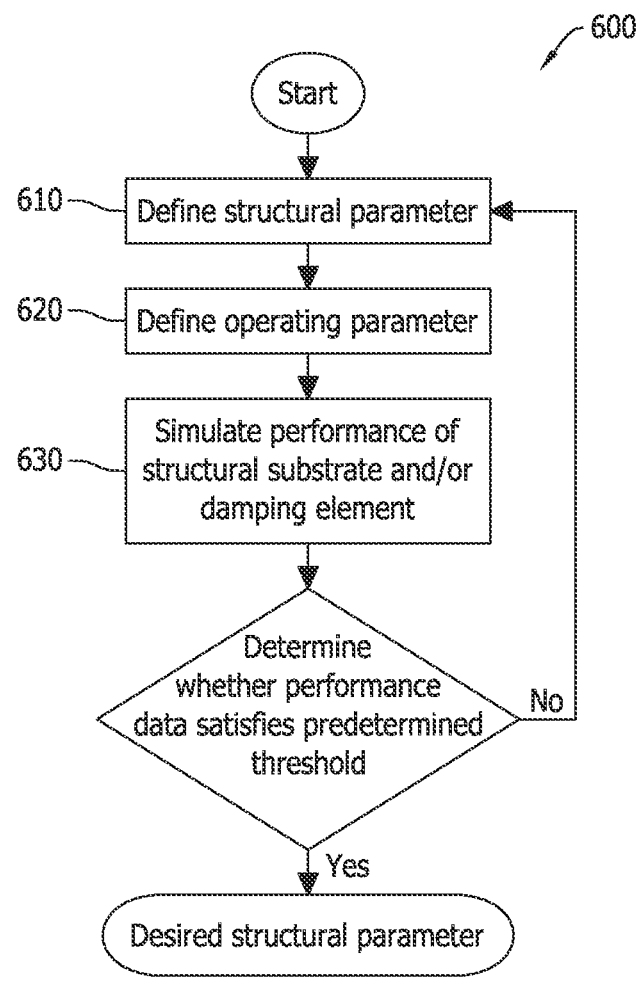
FIG. 5 is a flowchart of an example method for determining a parameter associated with the one or more damping elements shown in FIG. 3.

FIG. 5 is a flowchart of an example method 600 for determining a desired parameter associated with the one or more damping elements 320. During operation, in the exemplary embodiment, at least one first structural parameter associated with one or more damping elements 320, VEM layers 330 and/or constraining layers 340 is defined 610. Structural parameters include, for example, a modulus of elasticity of damping element 320, VEM layer 330 and/or constraining layer 340; a thickness of damping element 320, VEM layer 330 and/or constraining layer 340; a composition of damping element 320 (e.g., an alcohol content and/or a filler content of a material used to fabricate VEM layer 330), VEM layer 330 and/or constraining layer 340; and/or a distribution of damping element 320, VEM layer 330 and/or constraining layer 340 about structural substrate 310. In one implementation, a plurality of the modulus of elasticity, the thickness, the composition, and/or the distribution are defined 610. For example, in one embodiment, the modulus of elasticity of VEM layer 330 (e.g., urethane) is between approximately 50 pounds per square inch (psi) (approximately 344 kilopascal (kPa)) and approximately 100,000 psi (approximately 689,476 kPa); VEM layer thickness 410 is between approximately 0.001 inch (in.) (approximately 0.025 millimeters (mm)) and approximately 0.250 in. (approximately 6.350 mm); the modulus of elasticity of constraining layer 340 is between approximately 500,000 psi (approximately 3,447,378 kPa) and 30,000,000 psi (approximately 206,842,719 kPa), and constraining layer thickness 420 is between approximately 0.002 in. (approximately 0.050 mm) and approximately 1.0 inch (approximately 25.400 mm). Alternatively, any structural parameters may be defined that enables method 600 to function as described herein.

In the exemplary embodiment, at least one first operating parameter associated with structural substrate 310 and/or damping element 320 is defined 620. Operating parameters include, for example, an operating temperature, an operating frequency, and/or a physical configuration (e.g., shape, size, weight). In one implementation, a plurality of the operating temperature, the operating frequency, and/or the physical configuration are defined 620. For example, in one embodiment, an operating temperature range is between approximately −40° F. (approximately −40° C.) and approximately 160° F. (approximately 71° C.), and an operating frequency range is between approximately 1 Hertz (Hz) and approximately 20,000 Hz. Alternatively, any operating parameters may be defined that enables method 600 to function as described herein.

Evaluating a strain energy distribution and/or a ratio of shear modulus to thickness, for example, of structural substrate 310 and/or damping element 320 may enable a user to determine where damping will be effective. Modulus of elasticity, thickness, and/or distribution (e.g., distribution 430, 440, 450, 460, 470, and/or 480) may be tailored to satisfy vibration, noise, and/or weight requirements. For example, a finite element analysis for a predetermined and/or defined operating parameter may be used to identify and/or determine a desired modulus of elasticity, a desired thickness, and/or a desired distribution based on a strain energy distribution and/or a ratio of shear modulus to thickness. In at least some implementations, a desired distribution (e.g., distribution 430, 440, 450, 460, 470, and/or 480) may be determined, such that a desired thickness of damping element 320 is substantially zero in at least one region.

In the exemplary embodiment, a first performance of structural substrate 310 and/or damping element 320 is simulated 630 to generate a first performance data set. The first performance data set is associated with the first structural parameter and the first operating parameter. In the exemplary embodiment, a finite element model associated with structural substrate 310 to be damped and/or damping element 320 is generated based at least on the first structural parameter and the first operating parameter, and a finite element analysis is performed using the finite element model. For example, in one implementation, a finite element model of a nominal VEM layer 330 and a nominal constraining layer 340 are added to at least one surface of structural substrate 310. Alternatively, an evaluation setting may be defined using any method and/or process that enable the methods and systems to function as described herein.

In the exemplary embodiment, the first performance data set (e.g., a vibration and/or noise level) is compared to a predetermined threshold (e.g., a predetermined vibration and/or noise level) to determine 640 whether the first performance data set satisfies the predetermined threshold. If it is determined 640 that the first performance data set satisfies the predetermined threshold, then the first structural parameter (e.g., the modulus of elasticity, the thickness, and/or the distribution) is identified as a desired structural parameter for use in reducing a vibration and/or noise level associated with structural substrate 310.

The predetermined threshold is a value (or set of values) that represent a boundary (or set of boundaries) that distinguish a desired result from an undesired result. For example, in one implementation, the first performance data set includes at least one value associated with a vibration and/or noise level associated with structural substrate 310 having a first structural parameter. In such an implementation, the vibration and/or noise level associated with structural substrate 310 having the first structural parameter is compared to a boundary between a desired vibration and/or noise level and an undesired vibration and/or noise level. If the vibration and/or noise level associated with structural substrate 310 is determined to be a desired vibration and/or noise level, then the first structural parameter is determined and/or identified to be a desired structural parameter.

If it is determined that the first performance data does not satisfy the predetermined threshold, then the first structural parameter and/or the first operating parameter is adjusted and/or a second structural parameter and/or a second operating parameter is defined 610, 620 and the finite element model is modified in accordance with the adjusted and/or newly defined parameter. For example, in one implementation, a material property of a damping material is adjusted by determining an alcohol content and/or a filler content of at least one material used to fabricate VEM layer 330. In the exemplary embodiment, a second performance of structural substrate 310 and/or damping element 320 is simulated 630 to generate a second performance data set, which is compared to the predetermined threshold. In the exemplary embodiment, method 600 is iteratively repeated until at least one structural parameter that satisfies the predetermined threshold is identified.

In another implementation, the method includes calculating a respective loss factor for a plurality of VEM layers 330 having varying shear modulus and/or thickness to plot at least one loss factor v. shear modulus/thickness curve. Based on the loss factor v. shear modulus/thickness curve, at least one desired VEM layer 330 having a desired shear modulus and/or thickness parameter is determined for at least one desired operating parameter (e.g., frequency and temperature). Strain energy distribution in the at least one desired VEM layer 330 is then calculated to determine a distribution of a damping performance along a surface of structural substrate 310. Based on the strain energy distribution, a distribution of VEM layer 330 is determined to satisfy predetermined weight and/or cost parameters (e.g., adding and/or removing damping material based on the strain energy distribution, weight, and/or cost). A constraining layer modulus and/or thickness are then independently determined based on a series of models that vary these parameters. For example, the constraining layer parametrics are performed on a model that has at least one desired VEM layer 330 having desired shear modulus/thickness properties. Increasing a constraining layer stiffness will in general increase damping performance, cost, and/or weight, and decreasing a constraining layer stiffness will in general decrease damping performance, cost, and/or weight. Based on the constraining layer parametrics, at least one desired constraining layer parameter is determined to satisfy a desired damping performance, weight, and/or cost.

Figure 6:
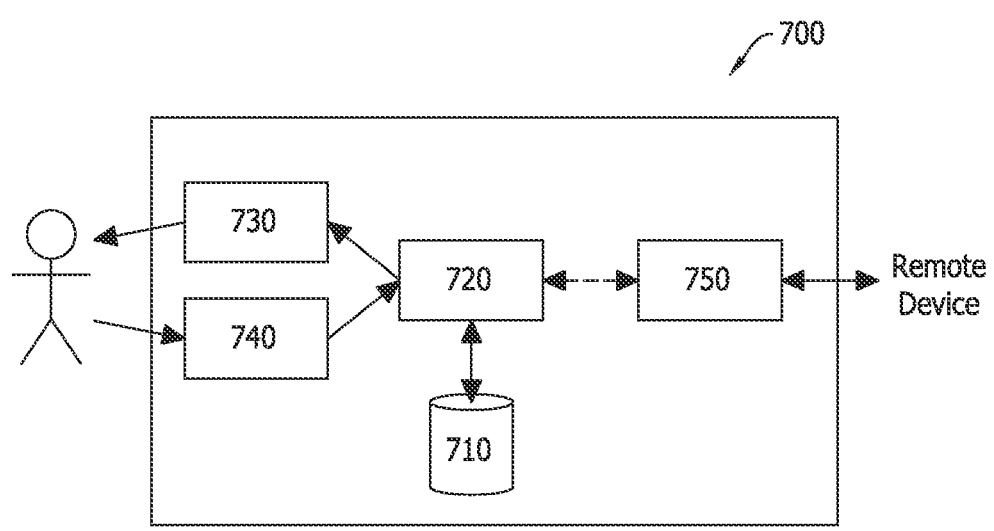
FIG. 6 is a block diagram of an example computing device used for implementing the method shown in FIG. 5.

FIG. 6 is a block diagram of an example computer system 700 that may be used to determine a desired structural and/or operating parameter associated with the one or more damping elements 320. In the exemplary embodiment, computer system 700 includes a memory device 710 and a processor 720 coupled to memory device 710 for use in executing instructions. More specifically, in the exemplary embodiment, computer system 700 is configurable to perform one or more operations described herein by programming memory device 710 and/or processor 720. For example, processor 720 may be programmed by encoding an operation as one or more executable instructions and by providing the executable instructions in memory device 710.

Processor 720 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 710 includes one or more devices (not shown) that enable information such as executable instructions and/or other data to be selectively stored and retrieved. In the exemplary embodiment, such data may include, but is not limited to, properties of materials, modeling data, calibration curves, operational data, and/or control algorithms. In the exemplary embodiment, computer system 700 is configured to automatically implement a finite element analysis to determine a desired structural and/or operating parameter associated with the one or more damping elements 320. Alternatively, computer system 700 may use any algorithm and/or method that enable the methods and systems to function as described herein. Memory device 710 may also include one or more computer readable media, such as, without limitation, dynamic random access memory (DRAM), static random access memory (SRAM), a solid state disk, and/or a hard disk.

In the exemplary embodiment, computer system 700 includes a presentation interface 730 that is coupled to processor 720 for use in presenting information to a user. For example, presentation interface 730 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 730 includes one or more display devices.

Computer system 700, in the exemplary embodiment, includes an input interface 740 for receiving input from the user. For example, in the exemplary embodiment, input interface 740 receives information suitable for use with the methods described herein. Input interface 740 is coupled to processor 720 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 730 and as input interface 740.

In the exemplary embodiment, computer system 700 includes a communication interface 750 that is coupled to processor 720. In the exemplary embodiment, communication interface 750 communicates with at least one remote device. For example, communication interface 750 may use, without limitation, a wired network adapter, a wireless network adapter, and/or a mobile telecommunications adapter. A network (not shown) used to couple computer system 700 to the remote device may include, without limitation, the Internet, a local area network (LAN), a wide area network (WAN), a wireless LAN (WLAN), a mesh network, and/or a virtual private network (VPN) or other suitable communication means.

The embodiments described herein relate generally to damping mechanisms and, more particularly, to methods and systems for use in determining a parameter associated with one or more damping elements. The embodiments described herein facilitate analytically and systematically simulate performances associated with at least one predefined structural parameter to generate performance data sets. In one embodiment, a finite element-based method is used to model damping mechanisms at a detailed level to facilitate determining and/or identifying at least one desired structural parameter associated with the one or more damping elements. Accordingly, the embodiments described herein facilitate determining a desired balance between a vibration and/or noise level associated with the structural substrate, and a weight associated with the structural substrate and/or the one or more damping elements.

Exemplary embodiments of methods and systems for determining at least one desired structural parameter associated with one or more damping elements are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing a noise level associated with a structural substrate, the method implemented using a computer device coupled to a user interface and a memory device, the method comprising:
    defining at least one of a modulus of elasticity, a thickness, and a distribution associated with one or more damping elements coupleable to the structural substrate;
    defining at least one operating parameter associated with the structural substrate and the one or more damping elements;
    simulating a first performance of at least one of the structural substrate and the one or more damping elements to generate a first performance data set, wherein the first performance data set is associated with the at least one operating parameter and the at least one of the modulus of elasticity, the thickness, and the distribution associated with the one or more damping elements;
    determining whether the first performance data set satisfies a predetermined threshold;
    if it is determined that the first performance data set does satisfy the predetermined threshold, reducing the noise level associated with the structural substrate by identifying the at least one of the modulus of elasticity, the thickness, and the distribution associated with the one or more damping elements as a desired structural parameter; and
    if it is determined that the first performance data set does not satisfy the predetermined threshold, adjusting one of the at least one operating parameter and the modulus of elasticity, the thickness, and the distribution associated with the one or more damping elements.

2. A method in accordance with claim 1 further comprising identifying the at least one of the modulus of elasticity, the thickness, and the distribution associated with the one or more damping elements as the desired structural parameter for use in reducing the noise level associated with the structural substrate.

3. A method in accordance with claim 1 further comprising:
defining at least two of the modulus of elasticity, the thickness, and the distribution associated with the one or more damping elements;
simulating a second performance of the at least one of the structural substrate and the one or more damping elements to generate a second performance data set, wherein the second performance data set is associated with the at least one operating parameter and the at least two of the modulus of elasticity, the thickness, and the distribution associated with the one or more damping elements;
determining whether the second performance data set satisfies the predetermined threshold; and
identifying the at least two of the modulus of elasticity, the thickness, and the distribution associated with the one or more damping elements as the desired structural parameter for use in reducing the noise level associated with the structural substrate.

4. A method in accordance with claim 1, wherein defining at least one operating parameter further comprises defining at least one of an operating temperature, an operating frequency, and a physical configuration associated with the structural substrate and the one or more damping elements.

5. A method in accordance with claim 1, wherein simulating a first performance further comprises:
generating a finite element model associated with at least one of the structural substrate and the one or more damping elements; and
performing a finite element analysis using the finite element model.

6. A method in accordance with claim 5, wherein simulating a first performance further comprises determining a strain energy distribution of at least one of the structural substrate and the one or more damping elements.

7. A method in accordance with claim 6 further comprising defining the distribution associated with the one or more damping elements based on the strain energy distribution, such that the structural substrate is exposed in at least one region where the strain energy distribution does not satisfy a predetermined threshold.

8. A method in accordance with claim 7, further comprising adjusting a material property of the one or more damping materials by determining at least one of an alcohol content and a filler content.

9. A method in accordance with claim 7, further comprising fabricating the one or more damping elements with a distribution based on the strain energy distribution, such that the structural substrate on which the one or more damping elements are distributed is exposed in at least one region where the strain energy distribution does not satisfy a predetermined threshold.

10. A computer system for reducing a noise level associated with a structural substrate, the computer system comprising:
one or more memory devices for storing data; and
one or more processors in communication with the one or more memory devices, the one or more processors programmed to:
define at least one of a modulus of elasticity, a thickness, and a distribution associated with one or more damping elements coupleable to the structural substrate;
define at least one operating parameter associated with the structural substrate and the one or more damping elements;
simulate a first performance of at least one of the structural substrate and the one or more damping elements to generate a first performance data set, wherein the first performance data set is associated with the at least one operating parameter and the at least one of the modulus of elasticity, the thickness, and the distribution associated with the one or more damping elements;
determine whether the first performance data set satisfies a predetermined threshold; if it is determined that the first performance data set does satisfy the predetermined threshold, reducing the noise level associated with the structural substrate by identifying the at least one of the modulus of elasticity, the thickness, and the distribution associated with the one or more damping elements as a desired structural parameter: and if it is determined that the first performance data set does not satisfy the predetermined threshold, adjusting one of the at least one operating parameter and the modulus of elasticity, the thickness, and the distribution associated with the one or more damping elements.

11. A system in accordance with claim 10, wherein the one or more processors is further programmed to identify the at least one of the modulus of elasticity, the thickness, and the distribution associated with the one or more damping elements as the desired structural parameter for use in reducing the noise level associated with the structural substrate.

12. A system in accordance with claim 10, wherein the one or more processors is further programmed to:
define at least two of the modulus of elasticity, the thickness, and the distribution associated with the one or more damping elements;
simulate a second performance of the at least one of the structural substrate and the one or more damping elements to generate a second performance data set, wherein the second performance data set is associated with the at least one operating parameter and the at least two of the modulus of elasticity, the thickness, and the distribution associated with the one or more damping elements;
determine whether the second performance data set satisfies the predetermined threshold; and
identify the at least two of the modulus of elasticity, the thickness, and the distribution associated with the one or more damping elements as the desired structural parameter for use in reducing the noise level associated with the structural substrate.

13. A system in accordance with claim 10, wherein the one or more processors is further programmed to define at least one of an operating temperature, an operating frequency, and a physical configuration associated with the structural substrate and the one or more damping elements.

14. A system in accordance with claim 10, wherein the one or more processors is further programmed to:
generate a finite element model associated with at least one of the structural substrate and the one or more damping elements; and
perform a finite element analysis using the finite element model.

15. A system in accordance with claim 14, wherein the one or more processors is further programmed to determine a strain energy distribution of at least one of the structural substrate and the one or more damping elements.

16. A system in accordance with claim 15, wherein the one or more processors is further programmed to define the distribution associated with the one or more damping elements based on the strain energy distribution, such that the structural substrate is exposed in at least one region where the strain energy distribution does not satisfy a predetermined threshold.

17. A system in accordance with claim 16 further comprising a viscoelastic material layup apparatus configured to fabricate the one or more damping elements with a distribution based on the strain energy distribution such that the structural substrate on which the one or more damping elements are distributed is exposed in at least one region where the strain energy distribution does not satisfy a predetermined threshold.

18. One or more non-transitory computer-readable storage media having computer-executable instructions embodied thereon, wherein, when executed by at least one processor, the computer-executable instructions cause the processor to:
define at least one of a modulus of elasticity, a thickness, and a distribution associated with one or more damping elements coupleable to a structural substrate;
define at least one operating parameter associated with the structural substrate and the one or more damping elements;
simulate a first performance of at least one of the structural substrate and the one or more damping elements to generate a first performance data set, wherein the first performance data set is associated with the at least one operating parameter and the at least one of the modulus of elasticity, the thickness, and the distribution associated with the one or more damping elements;
determine whether the first performance data set satisfies a predetermined threshold;
if it is determined that the first performance data set does satisfy the predetermined threshold, reduce a noise level associated with the structural substrate by identifying the at least one of the modulus of elasticity, the thickness, and the distribution associated with the one or more damping elements as a desired structural parameter; and
if it is determined that the first performance data set does not satisfy the predetermined threshold, adjusting one of the at least one operating parameter and the modulus of elasticity, the thickness, and the distribution associated with the one or more damping elements.

19. One or more non-transitory computer-readable storage media in accordance with claim 18, wherein the computer-executable instructions further cause the processor to identify the at least one of the modulus of elasticity, the thickness, and the distribution associated with the one or more damping elements as the desired structural parameter for use in reducing the noise level associated with the structural substrate.

20. One or more non-transitory computer-readable storage media in accordance with claim 18, wherein the computer-executable instructions further cause the processor to:
generate a finite element model associated with at least one of the structural substrate and the one or more damping elements; and
perform a finite element analysis using the finite element model.

21. One or more non-transitory computer-readable storage media in accordance with claim 18, wherein the computer-executable instructions further cause the processor to determine a strain energy distribution of at least one of the structural substrate and the one or more damping elements.

22. One or more non-transitory computer-readable storage media in accordance with claim 21, wherein the computer-executable instructions further cause the processor to define the distribution associated with the one or more damping elements based on the strain energy distribution, such that the structural substrate is exposed in at least one region where the strain energy distribution does not satisfy a predetermined threshold.

* * * * *